(12) United States Patent
Rice et al.

(10) Patent No.: US 12,160,468 B2
(45) Date of Patent: *Dec. 3, 2024

(54) PEER-TO-PEER NETWORK FOR TELECOMMUNICATION NETWORK TRAFFIC REROUTING

(71) Applicant: AT&T Intellectual Property I, L.P., Atlanta, GA (US)

(72) Inventors: Christopher W. Rice, Southlake, TX (US); Mazin Gilbert, Warren, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 242 days.

This patent is subject to a terminal disclaimer.

(21) Appl. No.: 17/804,589

(22) Filed: May 30, 2022

(65) Prior Publication Data

US 2022/0294847 A1 Sep. 15, 2022

Related U.S. Application Data

(63) Continuation of application No. 16/037,677, filed on Jul. 17, 2018, now Pat. No. 11,349,913.

(51) Int. Cl.
*H04L 67/1042* (2022.01)
*H04W 4/02* (2018.01)
*H04W 76/10* (2018.01)

(52) U.S. Cl.
CPC .......... *H04L 67/1042* (2013.01); *H04W 4/02* (2013.01); *H04W 76/10* (2018.02)

(58) Field of Classification Search
CPC ..... H04L 69/40; H04L 45/28; H04L 41/0663; H04L 67/1042; H04W 24/02; H04W 4/50; H04W 76/10; H04W 4/02; H04W 4/025; H04W 40/20; H04W 88/04; Y02D 30/70

See application file for complete search history.

(56) References Cited

U.S. PATENT DOCUMENTS

| | | |
|---|---|---|
| 6,111,881 A | 8/2000 | Soncodi |
| 6,804,532 B1 | 10/2004 | Moon et al. |
| 7,821,923 B2 | 10/2010 | Kakadia et al. |
| 7,839,767 B2 | 11/2010 | Vasseur |
| 8,355,368 B2 | 1/2013 | Lenzini et al. |
| 9,258,372 B2 * | 2/2016 | Bienfait ............... H04L 67/16 |
| 9,628,371 B2 | 4/2017 | Hui et al. |

(Continued)

*Primary Examiner* — Mehmood B. Khan

(57) ABSTRACT

Devices, computer-readable media and methods are disclosed for establishing a peer-to-peer network for rerouting network traffic of a telecommunication network during a network disruption. For example, a processing system may detect a network disruption between a first device and a second device of the telecommunication network. The processing system may identify a first peering device having a connection to the first device of the telecommunication network, identify a second peering device having a connection to the second device of the telecommunication network, and establish a peer-to-peer network via at least the first peering device and the second peering device, wherein at least one of the first peering device or the second peering device is a mobile endpoint device configured to operate as a virtual network function. The processing system may then route network traffic between the first device and the second device via the peer-to-peer network.

20 Claims, 3 Drawing Sheets

(56) References Cited

U.S. PATENT DOCUMENTS

| | | |
|---|---|---|
| 9,699,073 B2 | 7/2017 | Kotalwar et al. |
| 9,749,218 B1 * | 8/2017 | Felstaine ............... H04L 45/124 |
| 9,755,950 B2 | 9/2017 | Butler et al. |
| 9,866,430 B2 | 1/2018 | Hirsch |
| 11,349,913 B2 * | 5/2022 | Rice ........................ H04W 4/50 |
| 2008/0219151 A1 | 9/2008 | Ma et al. |
| 2010/0316033 A1 * | 12/2010 | Atwal ................. H04W 74/002 |
| | | 370/338 |
| 2014/0247769 A1 * | 9/2014 | Hall .................... H04W 40/023 |
| | | 370/312 |
| 2016/0134542 A1 | 5/2016 | Raileanu et al. |
| 2016/0182170 A1 * | 6/2016 | Daoura ............... H04W 12/033 |
| | | 455/3.01 |
| 2017/0019833 A1 * | 1/2017 | Luo .................... H04W 40/248 |
| 2017/0127289 A1 * | 5/2017 | Belz .................... G06K 9/00671 |
| 2017/0251066 A1 * | 8/2017 | Lawrenson ............. H04L 41/08 |
| 2018/0152807 A1 * | 5/2018 | Van Phan ............... H04W 4/02 |
| 2019/0037448 A1 * | 1/2019 | Shan ....................... H04W 4/44 |
| 2019/0320376 A1 * | 10/2019 | Djordjevic ............. H04L 45/28 |
| 2021/0314845 A1 * | 10/2021 | Desai ................. H04W 40/248 |

\* cited by examiner

PEER-TO-PEER NETWORK FOR TELECOMMUNICATION NETWORK TRAFFIC REROUTING

This application is a continuation of U.S. patent application Ser. No. 16/037,677, filed Jul. 17, 2018, now U.S. Pat. No. 11,349,913, which is herein incorporated by reference in its entirety.

The present disclosure relates generally to telecommunication network operations, and more particularly to devices, computer-readable media, and methods for establishing a peer-to-peer network for rerouting network traffic of a telecommunication network during a network disruption.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like, may be instantiated from the common resource pool. In addition, where the network edge has previously been well-defined, the advent of new devices and SDN architectures are pushing the edge closer and closer to the customer premises and to devices that customers use on a day-to-day basis.

SUMMARY

In one example, the present disclosure discloses a device, computer-readable medium, and method for establishing a peer-to-peer network for rerouting network traffic of a telecommunication network during a network disruption. For example, a processing system including at least one processor may detect a network disruption in a region of a telecommunication network, the network disruption preventing a communication between at least a first device of the telecommunication network and at least a second device of the telecommunication network. The processing system may then identify a first peering device of a plurality of peering devices having a connection to the first device of the telecommunication network, identify a second peering device of the plurality of peering devices having a connection to the second device of the telecommunication network, and establish a peer-to-peer network via at least the first peering device and the second peering device of the plurality of peering devices, wherein at least one of the first peering device or the second peering device is a mobile endpoint device, wherein the mobile endpoint device is configured to operate as a virtual network function. The processing system may then route network traffic between the first device of the telecommunication network and the second device of the telecommunication network via the peer-to-peer network.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
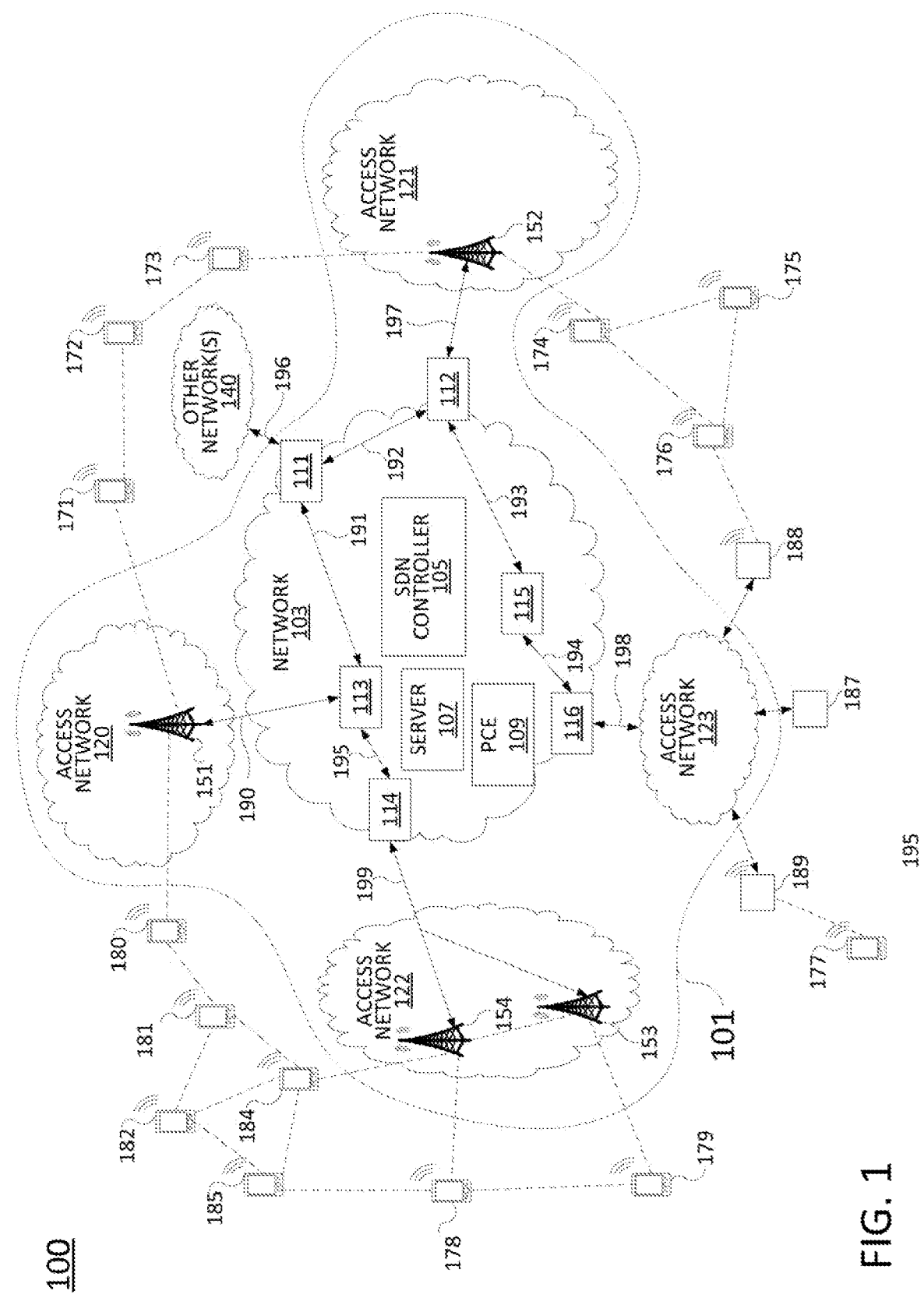
FIG. 1 illustrates an example system related to the present disclosure.

The present disclosure broadly discloses devices, computer-readable media and methods for establishing a peer-to-peer network for rerouting network traffic of a telecommunication network during a network disruption. For instance, examples of the present disclosure extend the telecommunication network using peering devices that are known to the telecommunication network as hop-on/hop-off points to the telecommunication network infrastructure. The peering device may include mobile endpoint devices such as smartphones, laptops, tablets, wearable computing devices, or the like, for cellular and/or non-cellular wireless communications, cellular hotspot devices, wireless access points, e.g., Wi-Fi routers, and so forth. The network extensions comprise sub-networks created via the peering devices through which network traffic can be offloaded from and rerouted back to the telecommunication network as appropriate. In one example, peering devices are configured to recognize other peering devices that are within an established range, e.g., within wireless connectivity range of each other and/or with a reference point, such as a cellular base station or wireless access point, within a given distance as established by global positioning system (GPS) location information, location information derived from cellular base station signaling, such as received signal strength location information, time of arrival location information, time difference of arrival location information, and/or angle of arrival location information, or other types of location based services (LBS) capability, and so forth.

In one example, upon detection of a network disruption by a telecommunication network-based controller, peering devices may be instructed to communicate with each other to establish a peer-to-peer network. Alternatively, or in addition, one or more of the peering devices may detect a network event and may reach out among themselves to establish the peer-to-peer network without instruction from a telecommunication network-based controller. In either case, at least two of the peering devices may establish (or maintain) connectivity to the telecommunication network to demarc hop-on and hop-off points for the peer-to-peer network to offload network traffic and to avoid the affected area(s) of the telecommunication network. In one example, the peering devices may also include telecommunication network infrastructure. For instance, a cellular base station that is unable to connect to other portions of the telecommunication network through primary and secondary backhauls may instead be reconfigured to operate as one of the peering devices in the peer-to-peer network. In one example, the peering devices may comprise "white boxes" that can be configured and reconfigured to operate as different types of devices and to provide different functions, in addition to the existing functionalities of being a mobile endpoint device, a cellular hotspot device, a wireless access point, and so forth.

In one example, users may be incentivized to participate in a peer-to-peer network in response to a network disruption by providing a discount or credit for telecommunication services. In one example, functionality to operate as a node in a peer-to-peer network of the present disclosure may be pre-loaded onto certain user devices that are provided by a telecommunication network service provider, such as personal base station devices, wireless hotspot devices, tablet computing devices or smartphones provided via the telecommunication network service provider in connection with subscription services, and so forth. These and other aspects of the present disclosure are discussed in greater detail below in connection with the examples of FIGS. 1-3.

To aid in understanding the present disclosure, FIG. 1 illustrates an example system 100 for performing or enabling the steps, functions, operations, and/or features described herein. The overall communications system 100 may include a telecommunication network 101, which may comprise any number of interconnected networks using the same or different communication technologies. As illustrated in FIG. 1, telecommunication network 101 may include a network 103. In one example, the network 103 may comprise a core network, a backbone network, and/or a transport network, such as an Internet Protocol (IP) network and/or an IP/Multi-Protocol Label Switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "network traffic"). However, it will be appreciated that the present disclosure is equally applicable to other types of data units and network protocols. In this regard, it should be noted that as referred to herein, "network traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "network traffic" is intended to refer to any quantity of data to be sent from a source to a destination through one or more networks.

The network 103 may alternatively or additionally comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 103 uses network function virtualization infrastructure (NFVI), e.g., servers in a data center or data centers that are available as host devices to host virtual machines (VMs) comprising virtual network functions (VNFs). In other words, at least a portion of the core telecommunications network 103 may incorporate software-defined network (SDN) components.

In one example, the network 103 may be in communication with wireless access networks 120-122. In one example, wireless access networks 120-122 may each comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access networks 120-122 may comprise access networks in accordance with any "second generation" (2G), "third generation" (3G), "fourth generation" (4G), Long Term Evolution (LTE), "fifth generation" (5G) or any other yet to be developed future wireless/cellular network technology. In one example, the wireless access networks 120-122 may include different types of networks. In another example, the wireless access networks 120-122 may be the same type of network. While the present disclosure is not limited to any particular type of wireless access network, in the illustrative example, wireless access networks 120-122 are shown as UMTS terrestrial radio access network (UTRAN) subsystems, e.g., evolved UTRANs (eUTRANs). Thus, elements 151-154 may each comprise a NodeB or evolved NodeB (eNodeB). In one example, elements 151-154 may each comprise at least one remote radio head (RRH). In one example, elements 151-154 may each further comprise at least one baseband unit.

In the example of FIG. 1, the network 103 is also in communication with access network 123, which may comprise a circuit switched network (e.g., a public switched telephone network (PSTN)), a cable network, a digital subscriber line (DSL) network, a metropolitan area network (MAN), an Internet service provider (ISP) network, and the like. As illustrated in FIG. 1, access network 123 provides network access to wireless access points 188 and 189, e.g., Institute of Electrical and Electronics Engineers (IEEE) 802.11/Wi-Fi routers, in addition to endpoint devices connecting thereto. In one example, endpoint device 187 may comprise a traditional telephone for voice calls over a circuit switched access network or over an IP-based access network, (e.g., VoIP). Wireless access networks 120-122 and access network 123 may be controlled or operated by a same entity as that of network 103. For instance, telecommunication network 101 is illustrated as including all of wireless access networks 120-122 and access network 123.

As illustrated in FIG. 1, network 103 is also connected to other networks 140. In one example, other networks 140 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 140 may include different types of networks. In another example, the other networks 140 may be the same type of network. The other networks 140 may be controlled or operated by one or more different entities. In one example, the other networks 140 may represent the Internet in general.

In one example, telecommunication network 101 may transport traffic to and from endpoint devices 171-185. For instance, the traffic may relate to communications such as voice telephone calls, video and other multimedia, text messaging, emails, and so forth among the endpoint devices 171-185, or between the endpoint devices 171-185 and other devices that may be accessible via access network 123 and/or other networks 140. Endpoint devices 171-185 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of endpoint devices 171-185 may have both cellular and non-cellular access capabilities and may further have wired communication and networking capabilities.

As mentioned above, various components of network 103 and/or telecommunication network 101 may comprise virtual network functions (VNFs) which may physically comprise hardware executing computer-readable/computer-executable instructions, code, and/or programs to perform various functions. As illustrated in FIG. 1, units 111-116 may comprise network function virtualization infrastructure (NFVI), which is configurable to perform a broad variety of network functions and services. In other words, the NFVI of network 103 may host various VNFs. For example, units 111-116 may comprise shared hardware, e.g., one or more host devices comprising line cards, central processing units (CPUs), or processors, memories to hold computer-readable/computer-executable instructions, code, and/or programs, and so forth. In the example of FIG. 1, units 111-116 may comprise edge routers, e.g., provider edge (PE) routers (or virtual provide edge (VPE) routers), which may provide connectivity to network 103 for access networks 120-123 and other networks 140, or internal nodes, such as switches, route reflectors, and so forth. Units 111-116 may be configured for IP routing and/or IP/MPLS routing, for example.

Any one or more of units 111-116 may alternatively or additionally comprise cellular core network components including a serving gateway (SGW), a mobility management entity (MME), a packet data network gateway (PDNGW or PGW), a home subscriber server (HSS), and so forth, television distribution components, such as a cable head end, a media server, a content distribution network (CDN) node, and so forth, IMS network and/or VoIP network components, a domain name service (DNS) server, a path computation entity (PCE), a firewall, a billing server, and so on. Although units 111-116 are described herein as comprising NFVI, it should be noted that in other, further, and different examples, any one or more of units 111-116 may comprise non-NFVI type devices, e.g., devices that are not part of an SDN control scheme and/or which may have substantially fixed functions.

In one example, units 111-116 may be controlled and managed by a software defined network (SDN) controller 105. For instance, in one example, SDN controller 105 is responsible for such functions as provisioning and releasing instantiations of VNFs to perform the functions of routers, switches, and other devices, provisioning routing tables and other operating parameters for the VNFs, and so forth. In one example, SDN controller 105 may maintain communications with VNFs and/or host devices/NFVI via a number of control links which may comprise secure tunnels for signaling communications over an underling IP infrastructure of network 103. In other words, the control links may comprise virtual links multiplexed with transmission traffic and other data traversing network 103 and carried over a shared set of physical links. For ease of illustration the control links are omitted from FIG. 1. In one example, the SDN controller 105 may also comprise a virtual machine operating on NFVI/host device(s), or may comprise a dedicated device. For instance, SDN controller 105 may be collocated with one or more VNFs, or may be deployed in a different host device or at a different physical location.

Figure 3:
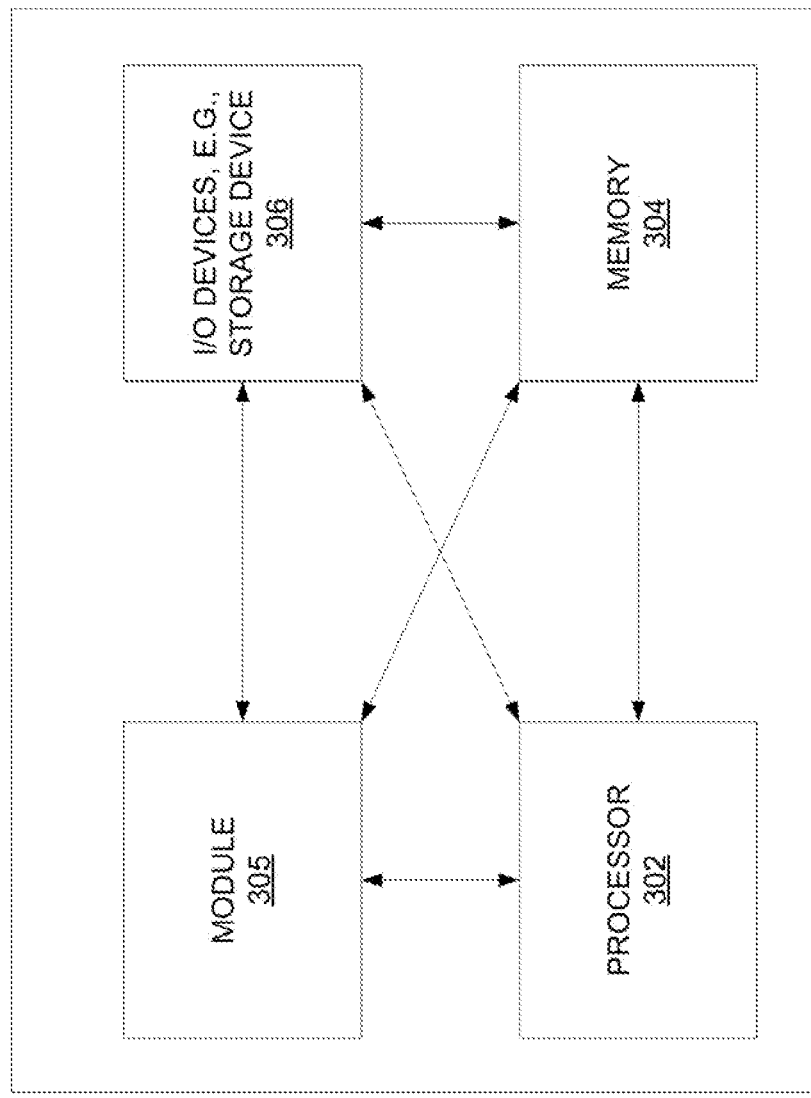
FIG. 3 illustrates an example high-level block diagram of a computer specifically programmed to perform the steps, functions, blocks, and/or operations described herein.

In one example, the SDN controller 105 may comprise a computing system or server, such as computing system 300 depicted in FIG. 3, and may be configured to provide one or more operations or functions in accordance with the present disclosure. The functions of SDN controller 105 may include the selection of NFVI from among various NFVI available in network 103 (e.g., units 111-116) to host various VNF which may cause the NFVI to be configured as various devices, such as routers, gateways, switches, etc., and the instantiation of such devices. For example, with respect to any one of units 111-116, SDN controller 105 may download computer-executable/computer-readable instructions, code, and/or programs (broadly "provisioning code"), which when executed by a processing system of the one of units 111-116 respectively, may cause the one of units 111-116 to perform as a label switched router (LSR), e.g., a label switched PE router, a gateway, a route reflector, a SGW, a MME, a firewall, a media server, a DNS server, a PGW, a GMSC, a SMSC, a CCE, and so forth. In one example, SDN controller 105 may download the provisioning code to the units 111-116. In another example, SDN controller 105 may instruct the units 111-116 to load the provisioning code previously stored on the units 111-116 and/or to retrieve the provisioning code from another device in network 103 that may store the provisioning code for one or more VNFs. The functions of SDN controller 105 may also include releasing or decommissioning VNFs from units 111-116 when no longer required, the transferring of VNFs from one unit to another, and so on.

In accordance with the present disclosure, peering devices may establish peer-to-peer networks for rerouting traffic of network 103, and for establishing and/or maintaining communications of the peering devices with other remote devices accessible via the network 103 when network disruptions are encountered with respect to network 103 and/or access networks 120-123. The peering devices may include devices at or near the network edge, e.g., in access networks 120-123 or beyond, such as elements 151-154, endpoint devices 171-185, wireless access points 188 and 189, and so on. As such, peering devices can include mobile endpoint devices such as smartphones, laptops, tablets, wearable computing devices, and so forth for cellular, Wi-Fi, or other short range peer-to-peer communications, such as Bluetooth, ZigBee, etc. In one example, peering devices may also include cellular base stations, such as service provider nodeBs, eNodeBs, or the like, home eNBs, personal cellular hotspot devices, wireless access points (e.g., Wi-Fi routers, Bluetooth beacons, etc.), and any other devices that can communicate via a wireless and/or non-wireless peer-to-peer protocol and which are associated with the telecommunication network 101 (either under the control of the operator or under the control of a customer/subscriber).

In one example, network 103 may include a server 107. Server 107 may comprise a computing system, such as computing system 300 depicted in FIG. 3, and may be configured to provide one or more operations or functions for establishing a peer-to-peer network for rerouting network traffic of a telecommunication network during a network disruption, in accordance with the present disclosure. For example, server 107 may be configured to perform one or more steps, functions, or operations in connection with the example method 200 described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

For instance, server 107 may detect network disruptions in network 103 or any of the access networks 120-123. In accordance with the present disclosure, a network disruption comprises any network event that prevents at least a portion (e.g., one or more network devices, one or more network paths, one or more network tunnels, etc.) of the network from being reachable through the network itself. For example, broadly a network disruption may comprise a network power outage in the region of the telecommunication network, a network hardware component failure in the region of the telecommunication network, or a loss of connectivity in the region of the telecommunication network. In other words, at least a portion of the devices of the telecommunication network 101 or serviced by the telecommunication network 101 is unable to communicate with other devices that are in the telecommunication network 101 and/or reachable via the telecommunication network 101. Network disruptions may have any number of causes, such as fiber cuts, hardware component failures, node failures, software configuration or upgrade errors, environmental or natural events, e.g., flooding, storms, earthquakes, or hurricanes causing widespread power outages, and so forth. The server 107 may detect a network disruption in any number of ways, such as by one or more nodes reporting a link failure, a threshold period of time passing without receiving a heartbeat message from one or more nodes, a notification from a node that the node or another neighboring node is or will be taken offline, a notification from a node that a link will be disconnected or is currently disconnected, a failure to respond to an inquiry or command from SDN controller 105, a notification from SDN controller 105 as to a change in the network that will interrupt communications on one or more of the links 190-199 and/or between one or more destinations, and so on.

In one example, when server 107 detects a network disruption, the server 107 may identify a region of the network 103 and/or the access networks 120-123 that is/are affected by the network disruption. Server 107 may then attempt to send instructions (e.g., broadly first or second instructions) to peering devices at or near to the region to establish a peer-to-peer network to avoid or circumvent the network disruption. For example, server 107 may detect a network disruption comprising a failure of link 191. In one example, server 107 may identify location(s)/region(s) affected by the network disruption. The location(s)/region(s) may be identified by geographic coordinates and/or may be identified in reference to a network topology map, a network provisioning database, or the like. For instance, interconnected links and devices may be indicated by such a map or provisioning database. In addition, circuits, label switched routes (LSRs), customer VPNs and so forth which are dependent upon links and devices which may be associated with a network disruption may also be indicated in such a network topology map, provisioning database, or the like. In the present example, server 107 may determine that unit 113 and access network 120 are unreachable from all portions of network 103 except via unit 114. In addition, server 107 may identify that element 152 in access network 121 is an edge device that is near the network disruption, where "near" may be determined in accordance with a threshold geographic distance, a threshold number of links or hops between the network disruption and the edge device, or similar criteria. Server 107 may therefore send one or more messages to any peering devices reachable via the element 152 (e.g., within wireless peer-to-peer communication range) to instruct the endpoint devices to configure a peer-to-peer network.

To illustrate, server 107 may, via element 152, send one or more broadcast messages to any peered device within communication range of element 152. The broadcast message(s) may be cellular broadcast message(s) or non-cellular wireless broadcast message(s). In one example, the broadcast message(s) may comprise a Wi-Fi Direct peer discovery message. In one example, server 107 may indicate to element 152 in a same message or in one or more separate messages that element 152 is an anchor device for the peer-to-peer network that is to be established, i.e., a device where the peer-to-peer network connects to the telecommunication network 101. Upon any peering device receiving the broadcast message, the peering device may then activate a functionality of being a node in a peer-to-peer network. In the example of FIG. 1, at least endpoint device 173 is within communication range of element 152. In one example, endpoint device 173 may retransmit the message from server 107, and/or transmit one or more new messages to any peering devices within communication range of endpoint device 173, e.g., where the message(s) further instruct(s) any other peering devices to reconfigure to be part of the peer-to-peer network. In the example of FIG. 1, endpoint device 172 is reachable in this way. The message(s) retransmitted by endpoint device 173 may comprise one or more non-cellular wireless broadcast messages, wireless ad-hoc networking protocol discovery messages, such as a Wi-Fi peer-to-peer/Wi-Fi Direct peer discovery messages, or the like. In one example, each of the peering devices receiving such a message may contact one or more other peering devices with a peer-to-peer invite request (e.g., Wi-Fi Direct peer invite) to establish the actual peer-to-peer links between peering devices.

Endpoint device 172 may also retransmit the message(s) from server 107 and/or transmit one or more new messages to any other peering devices, e.g., endpoint device 171, in range of endpoint device 172. As stated above, peering devices may also include devices that are not customer endpoint devices, such as elements 151 and 152. In this regard, endpoint device 171 may send message(s) that is/are received by element 151. Element 151 may therefore configure itself as a node in the peer-to-peer network. However, since element 151 is part of the access network 120 and has received the message(s) via one of the endpoint devices (e.g., endpoint device 171), and not via the network 103, element 151 may determine that it is an anchor device for the peer-to-peer network. In addition, the receiving of the message(s) via an endpoint device further indicates to element 151 that it is in a region that may be cut off from other parts of network 103 and access networks 121-123.

As such, a peer-to-peer network (e.g., a wireless ad-hoc network, mobile ad-hoc network, a wireless mesh network, a self-optimizing network (SON), etc.) comprising endpoint devices 171-173 and elements 151 and 152 may be established. The peer-to-peer network provides the ability for network traffic that would otherwise be carried via link 191 to instead be routed via the peer-to-peer network. For example, a user of endpoint device 180 may seek to send a text message to a user of endpoint device 176, which is reachable via access network 123 and wireless access point 188. Without the network disruption, the text message may be routed via element 151 through units 113, 111, 112, 115, and 116 in network 103, and via wireless access point 188 through access network 123. However, since unit 111 cannot be reached from unit 113 via link 191, the text message may instead be routed via the peer-to-peer network. For instance, endpoint device 180 may transmit the text message to element 151. Element 151 may then divert the text message to the peer-to-peer network through endpoint device 171 and exiting the peer-to-peer network via element 152. The text message may then be further routed to the destination, endpoint device 176 via units 112, 115, and 116 in network 103, and via wireless access point 188 through access network 123. The routing within and across the peer-to-peer network may be in accordance with the protocol used for communications of the peer-to-peer network, such as link state routing (LSR), distance vector routing, dynamic source routing, and so forth.

In one example, the message(s) to establish the peer-to-peer network may also indicate the location(s)/region(s) of the network disruption. The location(s)/region(s) may be identified by geographic coordinates or zones of coordinates and/or may be identified in accordance with a network topology that is known to devices in the network 103, access networks 120-123, and/or endpoint devices 171-185, and so forth. In one example, a peering device that may receive one or more messages to establish the peer-to-peer network may self-identify a location of the peering device to determine whether the peering device is between the anchor device where the message(s) originated and another location/region of the network that is beyond the location of the network disruption. For instance, endpoint device 174 may receive one or more messages from element 152 instructing peering devices to establish a peer-to-peer network to avoid the network disruption affecting link 191. However, endpoint device 174 may determine that the location of endpoint device 174 is further away from the network disruption than the element 152 and that endpoint device 174 is therefore not along a path that should be used to reroute network traffic around the network outage associated with link 191.

In one example, peering devices may have configuration code pre-stored thereon which may be activated in response to receiving one or more messages to self-configure as a peer-to-peer network node. In one example, for peering devices comprising user endpoint devices, the configuration code may be stored in a secure data store that is not accessible from the user space. In addition, the configuration code, when activated, may run in a dedicated portion of the memory that is not assignable to user applications or any other threads associated with the normal operations of the endpoint device (e.g., those operations which are not related to the establishment and operation as a node in the peer-to-peer network of the present disclosure). For example, the endpoint device may include a virtual machine monitor (VMM) or hypervisor which may maintain separate environments for user functions and the functions of a peer-to-peer network node in accordance with the present disclosure. In this regard, it should be noted that while the peer-to-peer network may be established utilizing the same functionality which may be accessed by a user to establish a peer-to-peer link, the peer-to-peer network of the present disclosure is not directly accessible from the user space. For instance, the user space and the peer-to-peer node functionality may comprise separate virtual machines operating on shared hardware and may communicate with one another as logically separate components. To illustrate, if the endpoint device has its own network traffic to send in connection with normal operations on behalf of the user, in one example, the network traffic may be sent from the user space virtual machine to the virtual machine for the node of the peer-to-peer network, e.g., via a VMM of the endpoint device. The peer-to-peer network node function may then route the network traffic in accordance with the configuration code.

In one example, the configuration code may further include code for additional functions, such as load balancing functions, quality of service (QoS) enforcement functions, and so forth. For instance, certain peering devices may include enhanced functional capabilities due to the superior processing capacity of such devices and/or a power availability of such devices (e.g., a home eNB plugged into a power source versus a smartphone operating on battery power), a willingness of an owner (e.g., of a user endpoint device) to host network traffic for others, a contractual requirement of an owner to host such functions, and so forth.

In one example, an anchor device or anchor devices of the peer-to-peer network may attempt to send a notification to the server 107 when the peer-to-peer network is established. The notification may identify the anchor device(s). The notification may also indicate a throughput, a bandwidth, a packet loss ratio, or other parameters of the peer-to-peer network. In one example, the parameters of the peer-to-peer network may be measured by one or more anchor devices, e.g., when the peer-to-peer network is established and/or periodically as the peer-to-peer network remains in operation. In one example, the parameters of the peer-to-peer network may be indicated separately for reaching devices in the peer-to-peer network and for routing network traffic through the peer-to-peer network (i.e., network traffic diverted from network 103 that is then routed back to network 103 for destination device(s) not within the peer-to-peer network). In one example, the notification may include a topology of the dynamically established peer-to-peer network and the peering devices within the peer-to-peer network.

In one example, the rerouting of network traffic to the peer-to-peer network is controlled from within the network 103. In one example, the server 107 may instruct units of network 103 (e.g., among units 111-116 that may process network traffic that is affected by the network event) to divert the network traffic to the peer-to-peer network. In one example, the server 107 may identify the peer-to-peer network as an available path to a path computation element (PCE) 109. For instance, network 103 may utilize IP/MPLS routing within the network 103. The PCE 109 may then receive requests from units within network 103 for path computation decisions regarding network traffic transiting via the units of network 103. For instance, unit 112 may be instructed to route traffic between endpoint device 180 and endpoint device 176 over link 197 (e.g., rather than over link 192 as may be the case in the absence of a failure of link 191).

In one example, server 107 may further communicate with SDN controller 105 to instantiate new VNFs, to reconfigure existing VNFs, and so forth in connection with the availability of the peer-to-peer network for the diversion of network traffic to the peer-to-peer network. For instance, additional routers may be instantiated via units 111-116, additional bandwidth may be assigned to or made available to links between various units 111-116, and so on. In addition, in one example, SDN controller 105 may further provision or reconfigure baseband units and/or remote radio heads, e.g., of elements 151 and 152 in anticipation of, or in response to a measured increase in the network traffic being handled by elements 151 and 152. In one example, server 107 may also identify one or more of the peering devices for performing additional functions, e.g., beyond simply operating as a routing node in the peer-to-peer network. For instance, certain peering devices may be instructed to additionally operate as a router, a buffer, a traffic shaper, a firewall, and so forth. It should be noted that once established, the instructions (e.g., broadly first or second instructions) may be sent via the peer-to-peer network to reach such peering devices.

In another example, endpoint device 178 may attempt to establish a voice call with endpoint device 187, e.g., a landline and/or VoIP telephone. Without the network disruption affecting link 191, the call may be established through access network 122, network 103, and access network 123 over links 199, 195, 191, 192, 193, 194, and 198. However, due to the unavailability of link 191, unit 113 may divert the call to the peer-to-peer network via link 190 and element 151. The peer-to-peer network may deliver data for the call between elements 151 and 152. For instance, for outbound voice data (e.g., network traffic) from endpoint device 178, unit 113 may divert the voice data to element 151, where the voice data is passed through the peer-to-peer network to element 152. Element 152 may then forward the voice data to unit 112 where the voice data is routed to endpoint device 187 via links 193, 194, and 198, and access network 123. Voice data from endpoint device 187 to endpoint device 178 may be similarly conveyed via a reverse path that includes the peer-to-peer network between elements 151 and 152. It should be noted that in one example, the voice call data (network traffic) may be conveyed as IP packets (e.g., VoIP) using IP and/or IP/MPLS routing in network 103, IP over cellular and/or Wi-Fi Direct in the peer-to-peer network, IP (VoIP) packets or data units in accordance with circuit-switched network technologies in the access network 123, and so forth.

In still another example, server 107 may detect a network disruption comprising a failure of link 199. For instance, a weather event may have damaged the link 199 or caused a connection to link 199 from elements 153 and 154 to be disconnected. Thus, the network 103 is not accessible via the access network 122. In such an example, server 107 may identify that element 151 in access network 120 and wireless access point 189 are edge devices that are near the network disruption. Server 107 may therefore send one or more messages to any reachable peering devices via the element 151 and the wireless access point 189 to instruct the peering devices to configure a peer-to-peer network. As illustrated in FIG. 1, endpoint device 177 may receive the message(s) via wireless access point 189. However, there are no further peering that are within communication range. Thus, one peer-to-peer network comprises wireless access point 189 and endpoint device 177. On the other hand, endpoint device 180 may receive the message(s) via element 151 and configure itself to operate as part of another peer-to-peer network. In addition, endpoint device 180 may forward the message(s) or transmit new message(s) which may be further received and forwarded by other peering devices to establish the peer-to-peer network.

It should be noted that the peer-to-peer network extends to endpoint device 179 and also includes the elements 153 and 154. While the elements 153 and 154 cannot utilize the normal backhaul (e.g., link 199), the elements 153 and 154 may still operate as peering devices in the peer-to-peer network. In addition, the elements 153 and 154 may have a greater range and throughput due to larger antennas, or remote radio heads (RRHs), carrier grade baseband processing units and/or other base station equipment. In one example, the elements 153 and 154 may also utilize both cellular and non-cellular wireless communications to provide additional bandwidth, and/or to provide additional security (e.g., using cellular communications between endpoint device 179 and element 153 instead of Wi-Fi), and so on. In one example, elements 153 and 154 may route network traffic for the peer-to-peer network via a wired link as an alternative or in addition to a cellular and/or a non-cellular wireless link. In the present example, the message(s) to establish the peer-to-peer network do not reach another edge device with a separate pathway to the network 103. Thus, this particular peer-to-peer network has just one anchor device, i.e., element 151.

Continuing with the present example, endpoint device 178 may attempt to retrieve weather information from a web server via other networks 140. In the absence of the network disruption, endpoint device 178 may establish a cellular data session with element 154 to reach the web server via access network 122, network 103, and other networks 140. However, due to the unavailability of link 199, access network 122 is isolated except for the peer-to-peer network anchored at element 151. Accordingly, endpoint device 178 may instead establish a connection to the web server via the peer-to-peer network, e.g., either through endpoint device 185 and/or through element 154.

In one example, the peer-to-peer network may utilize all-Wi-Fi Direct-based communications. In another example, the peer-to-peer network may utilize two or more peer-to-peer communication protocols, e.g., using Wi-Fi Direct between endpoint devices, and using cellular communication protocols when involving elements 151, 153, and 154 communicating with each other and/or with an endpoint device. For example, each of the peering devices comprising a user endpoint device that receives a message for establishing the peer-to-peer network may also determine whether it is in communication with cellular network infrastructure, e.g., elements 151-154. In particular, the peering device may also send a cellular or non-cellular peer discover message to one of the elements 151-154. If one of the elements 151-154 is within range, the one of elements 151-154 and/or the endpoint device may follow with a peer-to-peer invitation request. Alternatively, or in addition, a default bearer and/or dedicated bearer between the endpoint device and one of the elements 151-154 may be established for the exclusive use of the peer-to-peer network node function of the endpoint device (e.g., not accessible from the user space).

It should be noted that the system 100 has been simplified. In other words, the system 100 may be implemented in a different form than that illustrated in FIG. 1. For example, the system 100 may be expanded to include additional networks, such as NOC networks, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, SDN controller 105, server 107, and/or other network elements may comprise functions that are spread across several devices that operate collectively as a SDN controller, a server, etc. Thus, these and other modifications of the system 100 are all contemplated within the scope of the present disclosure.

Figure 2:
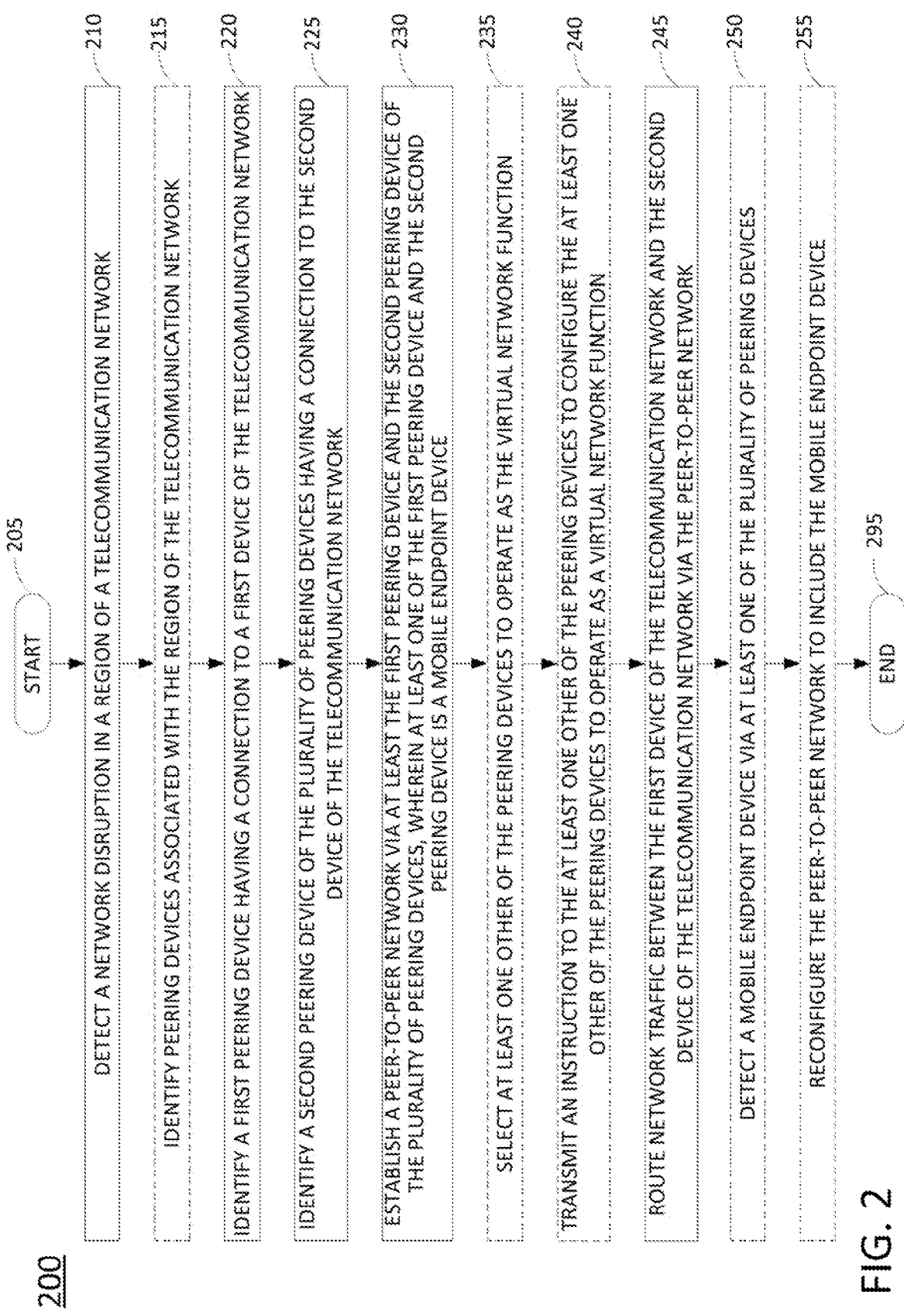
FIG. 2 illustrates a flowchart of an example method for establishing a peer-to-peer network for rerouting network traffic of a telecommunication network during a network disruption.

FIG. 2 illustrates a flowchart of an example method 200 for establishing a peer-to-peer network for rerouting network traffic of a telecommunication network during a network disruption. In one example, steps, functions and/or operations of the method 200 may be performed by a device as illustrated in FIG. 1, e.g., server 107, or any one or more components thereof, such as a processing system. Alternatively, or in addition, the steps, functions and/or operations of the method 200 may be performed by a processing system collectively comprising a plurality of devices as illustrated in FIG. 1, such as server 107, SDN controller 105, PCE 109, elements 151-154, units 111-116, endpoint devices 171-186, and so forth. In one example, the steps, functions, or operations of method 200 may be performed by a computing device or system 300, and/or a processing system 302 as described in connection with FIG. 3 below. For instance, the computing device 300 may represent at least a portion of a server, a peering device, and so forth in accordance with the present disclosure. For illustrative purposes, the method 200 is described in greater detail below in connection with an example performed by a processing system, such as processing system 302. The method 200 begins in step 205 and proceeds to step 210.

At step 210, the processing system detects a network disruption in a region of a telecommunication network, where the network disruption prevents a communication between at least a first device of the telecommunication network and at least a second device of the telecommunication network. For example, the network disruption may comprise a network outage in the region of the telecommunication network, a network failure in the region of the telecommunication network, a loss of connectivity in the region of the telecommunication network, and so forth. The network disruption may have any number of causes, such as fiber cuts, hardware component failures, node failures, software configuration or upgrade errors, environmental or natural events, e.g., flooding, storms, earthquakes, or hurricanes causing widespread power outages, and so forth. The network disruption may be detected in various ways, such as by one or more nodes reporting a link failure, a threshold period of time passing without receiving a heartbeat message from one or more nodes, a notification from a node that the node or another neighboring node is or will be taken offline, a notification from a node that a link will be disconnected or is disconnected, a failure to respond to a communication from an SDN controller, an advance notification of network maintenance or repairs, and so on.

At optional step 215, the processing system may identify the plurality of peering devices associated with the region of the telecommunication network, e.g., peering devices in or near the region. In one example, each of the plurality of peering devices is identified as being associated with the region of the telecommunication network via location information indicating that each of the peering devices is present in the region. The location information may comprise at least one of: global positioning system (GPS) location information, received signal strength (RSS) location information, time of arrival (TOA) location information, time difference of arrival (TDOA) location information, or angle of arrival (AOA) location information. In one example, the processing system may utilize location information that may be received and stored prior to detecting the network disruption. For instance, the processing system may track cellular endpoint device locations via a MME and/or an HSS that may collect and store location information as part of normal network operations.

At step 220, the processing system identifies a first peering device of a plurality of peering devices having a connection to the first device of the telecommunication network. For instance, the processing system may identify a peering device comprising a mobile endpoint device such as a smartphone, a laptop, a tablet computing device, a wearable computing device, or the like, a home eNB, personal cellular hotspot device, a wireless access point/wireless router, and so forth, which may have a connection to a cellular base station or a wireless access point of the telecommunication network, or which may have a connection to the telecommunication network via a wired access network (e.g., a personal computing device with wireless peer-to-peer networking capability, in addition to having a wired home Internet connection). Alternatively or in addition, the first peering device may comprise a cellular base station or non-cellular wireless access point of the telecommunication network which may be further connected to other devices of the telecommunication network. For example, a cellular base station may be connected to a cellular core network (e.g., via a serving gateway (SGW)). Similarly, a wireless access point of a wireless hotspot provided by the operator of the telecommunication network may be further connected to a core network edge router, or the like. In one example, the first peering device may be identified via a periodic heartbeat message sent by the first peering device to a component of the telecommunication network (e.g., to a MME and/or an HSS), or by way of a response to a message sent by the processing system via the first device of the telecommunication network.

At step 225, the processing system identifies a second peering device of the plurality of peering devices having a connection to the second device of the telecommunication network. For instance, the second peering device may be identified in the same or a similar manner as the first peering device as described in connection with step 220. However, the second peering device may connect to the second device of the telecommunication network (e.g., a second anchor device).

At step 230, the processing system establishes a peer-to-peer network via the plurality of peering devices, e.g., a wireless ad-hoc network and/or a wireless mesh network comprising a plurality of Wi-Fi peer-to-peer/Wi-Fi Direct links. In one example, the processing system establishes the peer-to-peer network via an instruction (e.g., first instruction) to at least one of the first of the plurality of peering devices or the second of the plurality of peering devices. In one example, the at least one of the first of the plurality of peering devices or the second of the plurality of peering devices may communicate (e.g., using the same first instruction or a new second instruction) with other peering devices of the plurality of peering devices to establish the peer-to-peer network. For instance, the plurality of peering devices may exchange wireless ad-hoc networking protocol discovery messages, such as a Wi-Fi peer-to-peer/Wi-Fi Direct peer discovery messages, or the like. In addition, the plurality of peering devices may utilize peer-to-peer invite requests to further set up the peer-to-peer wireless links. In one embodiment, at least one of the first peering device and the second peering device of the plurality of peering devices is a mobile endpoint device, wherein the endpoint device is configured to operate as a virtual network function.

In one example, each of the plurality of peering devices has a connection to at least one other of the plurality of peering devices. In addition, in one example, the peer-to-peer network comprises a plurality of wireless links among the plurality of peering devices. The wireless links may comprise non-cellular wireless links (e.g., Wi-Fi Direct). The wireless links may also comprise at least one cellular wireless link. In one example, the plurality of peering devices comprises at least one mobile endpoint device. In addition, in one example, the plurality of peering devices further comprises at least one wireless access point. For instance, instead of providing endpoint devices with a connection to a wired access network, the wireless access point may instead be wirelessly connected to one or more other wireless access points and/or to one or more mobile endpoint devices as part of the peer-to peer network.

In one example, the peer-to-peer network may also include at least one wired link among the plurality of peering devices. For example, two cellular base stations may be linked together by a fiber backhaul, while the network disruption may comprise a fiber cut closer to the core network. Thus, in one example, the cellular base stations may communicate with each other as wireless peers. However, as an alternative, or in addition, the cellular base stations may also communicate with each other as peers via the wired connection.

At optional step 235, the processing system may select at least one other of the peering devices (e.g., other than the first or the second peering device) to operate as a virtual network function (VNF) based upon at least one of: a location of the at least one other of the peering devices relative to a location of the network disruption, the location of the at least one other of the peering devices relative to an access point of the telecommunication network, or a capacity of the at least one other of the peering devices, such as a processing capacity, a memory capacity, a power capacity (e.g., having extended battery power and/or AC power source), or the like. The VNF may comprise, for example, a router, a buffer, a firewall, a traffic shaper, and so forth.

At optional step 240, the processing system may transmit an instruction to the at least one other of the peering devices to configure the at least one other of the peering devices to operate as the VNF. The instruction may indicate to the peering device where and/or how to obtain a configuration code for the VNF, may indicate to the peering device that configuration code will be provided via the processing system and/or from another source, and so on. In one example, the peering device may also have configuration code stored thereon and may activate the configuration code in response to the instruction.

At step 245, the processing system routes network traffic between the first device of the telecommunication network and the second device of the telecommunication network via the peer-to-peer network. In one example, the network traffic is routed between the first device of the telecommunication network and the second device of the telecommunication network via at least the first peering device and the second peering device. In one example, the network traffic originates external to the plurality of peering devices. For instance, the network traffic may be placed onto the peer-to-peer network from the telecommunication network and may be returned to the telecommunication network at an egress from the peer-to-peer network, e.g., thereby routing the network traffic around the network disruption.

At optional step 250, the processing system may detect a mobile endpoint device via at least one of the plurality of peering devices. For instance, the mobile endpoint device may be within wireless communication range of at least one of the plurality of peering devices and may be detected via a wireless peer discovery message (e.g., a Wi-Fi Direct peer discovery message transmitted by either the mobile endpoint device or the at least one of the plurality of peering devices). It should be noted that the peering devices of the peer-to-peer network can include mobile endpoint devices, wireless access points, etc., but optional step 250 relates to a new mobile endpoint device entering the area and that may be detected via wireless peer discovery.

At optional step 255, the processing system may reconfigure the peer-to-peer network to include the new mobile endpoint device. In one example, the peer detection of optional step 250 may be reported to the processing system which may be centralized in the telecommunication network, and the processing system may send an instruction to the at least one of the plurality of peering devices to send a peer invite request to the new mobile endpoint device. In another example, the processing system may be expanded to include the peering devices of the peer-to-peer network, and the reconfiguring of the peer-to-peer network of optional step 255 may be performed by the peering devices themselves while self-optimizing.

Following step 245, or one of optional steps 250-255, the method 200 proceeds to step 295. At step 295, the method 200 ends.

It should be noted that the method 200 may be expanded to include additional steps or may be modified to include additional operations with respect to the steps outlined above. For instance, in one example the processing system may detect that a network disruption is resolved and may tear down the peer-to-peer network accordingly. In one example, the method 200 may be repeated for other network disruptions in the same or different regions of the network. In one example, the method 200 may further include provisioning or reconfiguring VNFs and/or NFVI within the network to support the diversion of network traffic to the peer-to-peer network. Thus, these and other modifications are all contemplated within the scope of the present disclosure.

In addition, although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted either on the device executing the method 200, or to another device, as required for a particular application. Furthermore, steps, blocks, functions, or operations in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the examples of the present disclosure.

It should be noted that the above disclosure discloses various scenarios impacting a particular region of the telecommunication network. It should be noted that a network disruption may impact multiple different regions of the telecommunication network simultaneously. As such, the present disclosure is equally applicable when the network disruption impacts multiple different regions of the telecommunication network simultaneously, i.e., the dynamic establishment of multiple peer to peer networks as necessary. Additionally, in one embodiment when an endpoint device is requested to support the dynamic establishment of the peer to peer network in response to a network disruption, it is based on receiving prior authorization from the user of the mobile endpoint device, e.g., when the user opted into a service for supporting the establishment of the peer to peer network, or informed dynamically in real time of the need to establish the peer to peer network when the network disruption occurs. Once authorization is received from the user, the peer to peer network can be established. In one embodiment, an incentive is provided to the users for their assistance in the establishment of the peer to peer network to alleviate the network disruption, e.g., a monetary-based incentive, e.g., receiving a discount in their bills, or a service-based incentive, e.g., receiving an additional new service without charge for a limited time, or a service upgrade for a limited time, and so on.

FIG. 3 depicts a high-level block diagram of a computing device or processing system specifically programmed to perform the functions described herein. As depicted in FIG. 3, the computing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for establishing a peer-to-peer network for rerouting network traffic of a telecommunication network during a network disruption and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for establishing a peer-to-peer network for rerouting network traffic of a telecommunication network during a network disruption (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/ or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for establishing a peer-to-peer network for rerouting network traffic of a telecommunication network during a network disruption (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
reporting, by a processor of a first wireless device, to a processing system of a telecommunication network that a second wireless device has been discovered;
receiving, by the processor of the first wireless device, a first instruction from the processing system of the telecommunication network to invite the second wireless device to form a peer-to-peer network;
sending, by the processor of the first wireless device, an invite message to the second wireless device to form the peer-to-peer network;
receiving, by the processor of the first wireless device, an acceptance message from the second wireless device to form the peer-to-peer network, wherein the peer-to-peer network is formed comprising the first wireless device and the second wireless device; and
receiving, by the processor of the first wireless device, network traffic originating from a first core network component device of the telecommunication network to be routed to a second core network component device of the telecommunication network via the peer-to-peer network due to a network disruption in a region of the telecommunication network.

2. The method of claim 1, wherein at least one of: the first wireless device or the second wireless device is a mobile endpoint device.

3. The method of claim 2, wherein the mobile endpoint device is configured to operate as a virtual network function.

4. The method of claim 1, further comprising:
forwarding, by the processor of the first wireless device, the network traffic originating from the first core network component device of the telecommunication network to the second wireless device for delivery to the second core network component device of the telecommunication network.

5. The method of claim 1, wherein the first wireless device and the second wireless device are identified as being associated with the region of the telecommunication network.

6. The method of claim 5, wherein each of the first wireless device and the second wireless device is identified via respective location information as being associated with the region of the telecommunication network.

7. The method of claim 6, wherein the location information comprises at least one of:
    global positioning system location information;
    received signal strength location information;
    time of arrival location information;
    time difference of arrival location information; or
    angle of arrival location information.

8. The method of claim 1, further comprising:
    receiving, by the processor of the first wireless device, a second instruction from the processing system of the telecommunication network to configure the first wireless device to operate as a virtual network function.

9. The method of claim 8, wherein the virtual network function comprises at least one of:
    a router;
    a buffer;
    a firewall; or
    a traffic shaper.

10. The method of claim 8, wherein the first wireless device is selected to operate as the virtual network function based upon at least one of:
    a location of the first wireless device relative to a location of the network disruption;
    the location of the first wireless device relative to an access point of the telecommunication network; or
    a capacity of the first wireless device.

11. The method of claim 1, wherein at least one of: the first wireless device or the second wireless device is a wireless access point.

12. The method of claim 1, wherein the peer-to-peer network comprises one or more wireless links between the first wireless device and the second wireless device.

13. The method of claim 12, wherein the peer-to-peer network further comprises at least one wired link between the first wireless device and the second wireless device.

14. The method of claim 1, wherein the network disruption comprises a network power outage in the region of the telecommunication network.

15. The method of claim 1, wherein the network disruption comprises a network hardware component failure in the region of the telecommunication network.

16. The method of claim 1, wherein the network disruption comprises a loss of connectivity in the region of the telecommunication network.

17. The method of claim 1, wherein the network traffic originates external to the first wireless device and the second wireless device.

18. The method of claim 1, wherein each of the first wireless device and the second wireless device has a connection to at least one other peering device.

19. A first wireless device comprising:
    a processing system including at least one processor; and
    a computer-readable medium storing instructions which, when executed by the processing system, cause the processing system to perform operations, the operations comprising:
        reporting to a processing system of a telecommunication network that a second wireless device has been discovered;
        receiving a first instruction from the processing system of the telecommunication network to invite the second wireless device to form a peer-to-peer network;
        sending an invite message to the second wireless device to form the peer-to-peer network;
        receiving an acceptance message from the second wireless device to form the peer-to-peer network, wherein the peer-to-peer network is formed comprising the first wireless device and the second wireless device; and
        receiving network traffic originating from a first core network component device of the telecommunication network to be routed to a second core network component device of the telecommunication network via the peer-to-peer network due to a network disruption in a region of the telecommunication network.

20. A non-transitory computer-readable medium storing instructions which, when executed by a processing system including at least one processor of a first wireless device, cause the processing system to perform operations, the operations comprising:
    reporting to a processing system of a telecommunication network that a second wireless device has been discovered;
    receiving a first instruction from the processing system of the telecommunication network to invite the second wireless device to form a peer-to-peer network;
    sending an invite message to the second wireless device to form the peer-to-peer network;
    receiving an acceptance message from the second wireless device to form the peer-to-peer network, wherein the peer-to-peer network is formed comprising the first wireless device and the second wireless device; and
    receiving network traffic originating from a first core network component device of the telecommunication network to be routed to a second core network component device of the telecommunication network via the peer-to-peer network due to a network disruption in a region of the telecommunication network.

* * * * *